Dec. 7, 1971  C. E. REYNOLDS  3,624,867
PLASTIC LOCKING NUT IN STRIP FORM
Filed Sept. 20, 1968  4 Sheets-Sheet 2
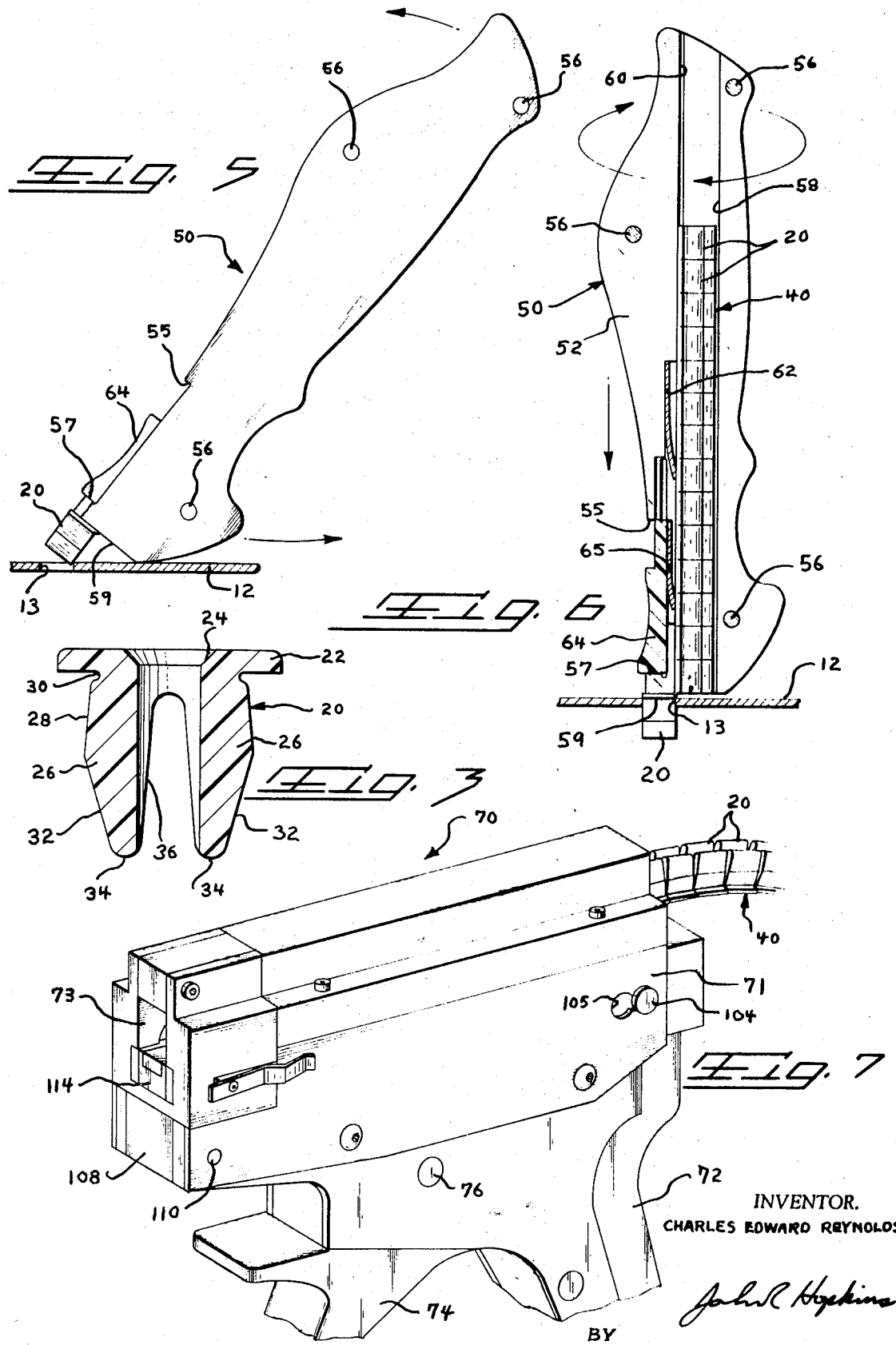
INVENTOR.
CHARLES EDWARD REYNOLDS
BY

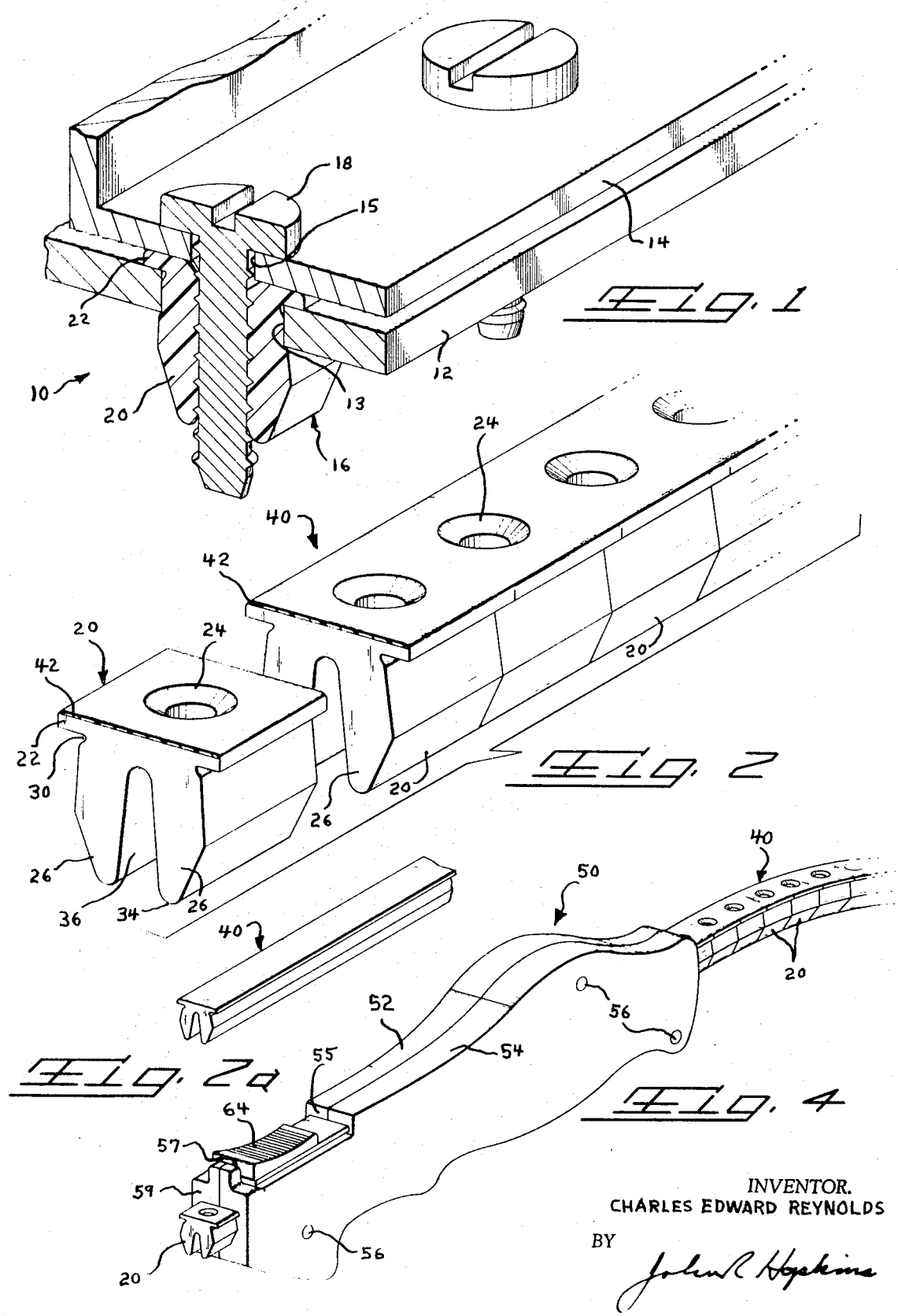

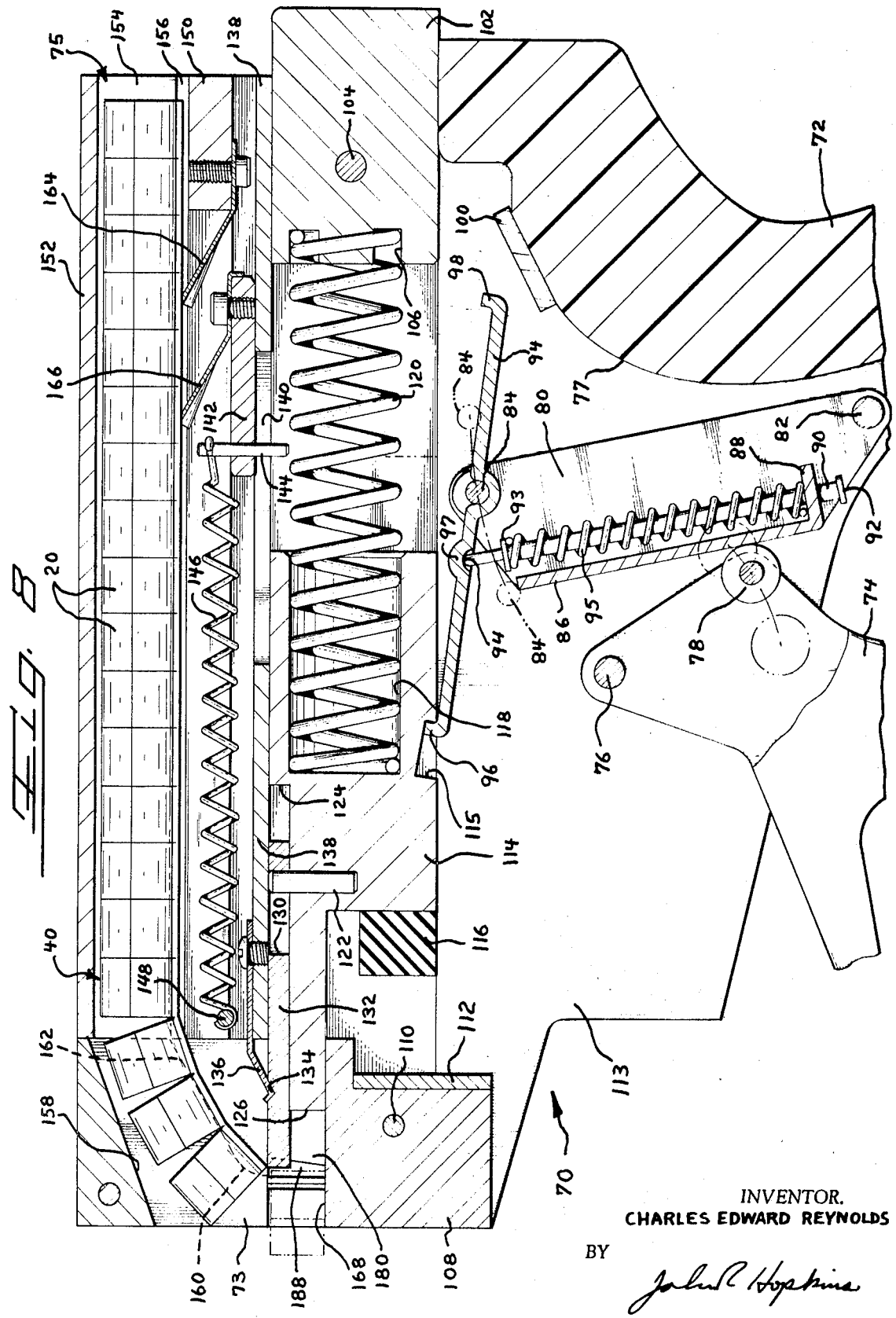

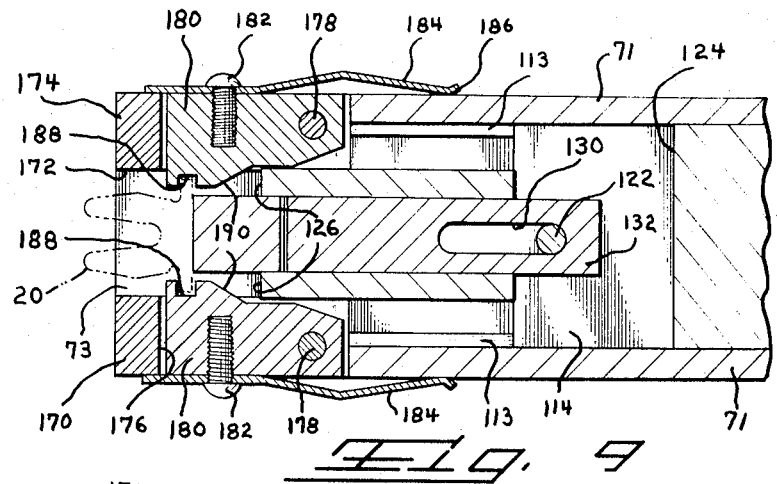
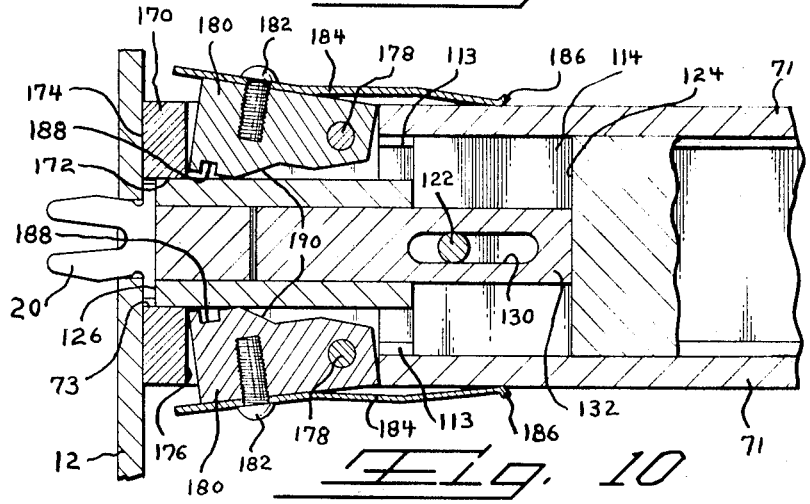
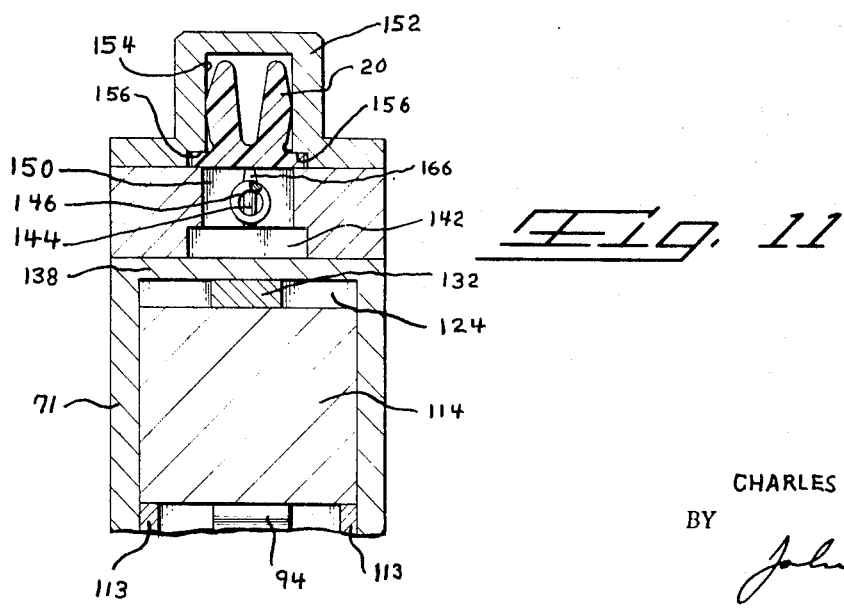

United States Patent Office 3,624,867
Patented Dec. 7, 1971

1

3,624,867
PLASTIC LOCKING NUT IN STRIP FORM
Charles Edward Reynolds, Camp Hill, Pa., assignor to
AMP Incorporated, Harrisburg, Pa.
Filed Sept. 20, 1968, Ser. No. 761,063
Int. Cl. A44b 21/00
U.S. Cl. 24—73 PF                                5 Claims

ABSTRACT OF THE DISCLOSURE

A plastic locking nut for fastening elements together is disclosed in strip form with a head portion of each of a series of nuts hinged to facilitate reeling of a strip of nuts and severing one nut from an adjacent nut for installation purposes. Each nut is provided with a cross-sectional configuration permitting the nut body to be formed essentially by extrusion with the nut including resilient legs operable transverse to the nut body in a sense accommodating extrusion tolerance and with the nut extrusion cut to provide its length dimension and thus made to a closer tolerance in such dimension. Each nut includes a slight recess between depending legs and the head portion to accommodate plastic scraped from the nut during installation.

RELATED CASES

This case is related in concept to U.S. application Ser. No. 761,064 entitled Plastic Fastener Strip and Installation Tooling Therefor, filed of even date in the name of Charles Edward Reynolds.

BACKGROUND OF THE INVENTION

Plastic fasteners have come into wide usage to secure a variety of elements together. Typical fasteners are comprised of a nut like element of plastic material defining a head and resilient legs of a configuration to be extended through the aperture in a mounting panel or board. The element to be mounted is then placed against the head and a self-tapping screw is threaded through the body of the nut to expand the legs within the aperture of the mounting panel and lock the mounted element thereto. Fasteners of this type are sometimes termed panel nuts or screw anchors, or the like. The configuration of a large number of existing fasteners requires nut elements to be formed by cavity molding, resulting in a relatively high cost for each part. While some effort has been made to produce plastic fasteners by extrusion, as in U.S. Pat. 3,130,464, or to otherwise produce fasteners joined together in strip form, as in U.S. Pat. 3,083,429, the prior art does not contemplate fasteners capable of field use in strip form by simple installation tooling on a production basis; the prior art structures typically having a configuration requiring a secondary operation not amenable to field use of the fastener in strip form. As another problem, standard extrusion techniques may not provide a close enough tolerance to assure proper mating of a nut element with an panel aperture. With respect to prior art tooling for installing fasteners, the prior art is best developed relative to stapling machines such as U.S. Pat. No. 2,240,455, automatic nail guns, such as U.S. Pat. 2,923,937 and the like, which are relatively complex in terms of structure and although satisfactory for handling and installing metal parts, are not readily amenable to installation of plastic nuts into mounting apertures.

SUMMARY OF THE INVENTION

This invention relates to plastic fastener locking nuts in strip form and to installation tooling therefor.

It is an object of the invention to provide a plastic fastener locking nut in strip form which may be utilized in the field in strip form directly by hand, by simple tooling or by semi-automatic tooling to fasten elements together in a reliable manner. It is a further object to provide a fastener nut in strip form which is of an extruded thermoplastic and which has a configuration to eliminate tolerance criticality as to the extruded dimension. It is yet a further object to provide a low cost method of joining elements together through the provision of an inexpensive fastener structure capable of being rapidly installed by a few simple steps. It is another object to provide a plastic locking nut strip which may be fed through an installation tool, positioned for installation and installed either manually or semi-automatically. It is still another object to provide a rapid technique for installing fasteners in the field through a simple, inexpensive and reliable fastener structure and tooling therefor.

In the drawings:

FIG. 1 is a perspective view somewhat enlarged from actual size, depicting a pair of elements fastened together by a fastener nut in accordance with the present invention, one fastener and the elements being shown in section at one end thereof;

FIG. 2 is a perspective view of a strip of locking nuts in finished form with one nut severed and displaced from the strip;

FIG. 2a is a perspective of the strip as initially formed;

FIG. 3 is a sectional view of the fastener shown in FIG. 2;

FIG. 4 is a perspective view of an installation tool in accordance with a manual embodiment of the invention having a strip of locking nuts therein with one nut extended therefrom, preparatory for installation in a panel aperture;

FIG. 5 is an elevational view of the tool shown in FIG. 4 with a locking nut displaced just prior to being inserted within the aperture of a panel;

FIG. 6 is an elevational view of a tool of FIG. 5, partially sectioned with a locking nut inserted and seated within a panel just prior to the removal of the tool and separation of the nut from the strip of nuts carried therein;

FIG. 7 is a perspective view of the upper portion of a semi-automatic tool embodiment of the invention having a strip of locking nuts fitted therein;

FIG. 8 is an enlarged and sectional view of the top portion of the tool shown in FIG. 7 included to illustrate the working mechanism of such tool to carry a supply of locking nuts, position such nuts and install one nut at a time in the aperture of a panel;

FIG. 9 is a sectional top view of the front end of the tool of FIG. 7, depicting a mechanism therein positioned to guide one locking nut into a position preparatory for installation in a panel aperture;

FIG. 10 is a view of the structure shown in FIG. 9, just following operation to install a nut in the aperture of a panel; and FIG. 11 is a sectional view taken through lines 11—11 of the head of the tool as depicted in FIG. 8.

DESCRIPTION OF PREFERRED EMBODIMENT

Referring now to FIG. 1, an assembly 10 is intended to depict the fastening together of two elements 12 and 14 through a fastener assembly 16 including a screw 18 and a plastic locking nut 20. Element 12 may be considered as a panel, board, sheet or the like, and element 14 may be considered as a panel, strip, rack, shelf, or the like, which must be mechanically secured to element 12 in a reliable manner. The element 14 may be used for mechanical purposes or for both mechanical and electrical purposes; the element 14 being necessarily insulated from as well as mechanically fastened to element 12 by plastic nut 20. Panel 14 may be ornamental, as well as mechanically functional, such as are the strips on the exteriors of vehicles or office furniture and the like.

Elements 12 and 14 are depicted as metal, but it is also contemplated that the elements may be either of metal, plastic or some other material. Each element includes a panel portion having an aperture therein, the panel portion of 12 having an aperture 13, which serves as a mounting aperture for such element and panel 14 having an aperture 15 of similar purposes. Aperture 13 is square to accommodate fastener 20, and aperture 15 is usually circular to accommodate screw 18. These apertures are typically punched or die cut on appropriate centers.

Nut 20 of the assembly 16 is first positioned and seated within aperture 13 with the panel 14 then being positioned thereover and the screw 18 fitted through aperture 15 and threaded down into the interior of nut 20, biting or tapping into the body of 20, to pull panel 14 down tightly against the head of the nut body, such head being shown as 22. In this way element 14 is securely mounted on and to element 12.

Typically, element 12 and 14 may require a series of fastener assemblies 16 and typically a row of apertures 13 in a given mounting element may be addressed and loaded with nuts 20, followed by positioning the element 14 thereover, and loading the individual nuts with screws 18, which are then threaded down to fasten the two elements together. It is this typical usage which is the concern of the present invention; namely, that in field use a series of fasteners may be repetitively installed in a series of apertures by an operator provided with fasteners of suitable construction and hand tools of suitable construction in a common and repetitive series of steps with the fasteners and tooling commonly oriented and simply manipulated.

Referring now to FIGS. 1, 2, 2a and 3, locking nut 20 of assembly 16 is comprised of a one-piece element of plastic, insulating and/or dielectric material having an exterior shape which lends itself to being formed by extrusion with a minimum secondary operation to achieve the final configuration. Nut 20 includes a head 22 containing in the center of the upper surface thereof a bore 24, beveled at the top as shown and extended through the head and down partially within a pair of legs 26 separated to define a slot 36. The leg separation provides a flexible action transverse to the longitudinal axis of the nut. The legs have an exterior configuration to include in a relaxed condition a first outer surface 28, which angles outwardly to a slight extent from the longitudinal axis of the nut. Surface 28 leads upwardly to a relief shown as 30, underneath head 22, which relief serves the function of accommodating any plastic scraped off the legs during nut insertion and particularly if the nut is impact inserted. Surface 28 leads downwardly to a further surface 32 which angles inwardly to a greater extent toward the nut longitudinal axis and terminates in a lower rounded portion 34. As can be seen in FIG. 1, nut 20 is dimensioned relative to the panel aperture 13, so as to be compressed widthwise an appreciable amount as it is inserted through such aperture. This compression is in a sense to accommodate variations in the extruded dimension. The rounded portion 34 and particularly surface 32, operates to guide the two legs 26 into the aperture to position surface 28 with aperture 13. Head 22 is dimensioned to stop insertion of the nut within aperture 13 and to provide a standoff or space between element 12 and element 14. With the nut inserted within the aperture and the element 14 properly placed thereon, screw 18 is then threaded interiorly of the nut to compress the nut material in the plane of aperture 13 and expand the nut material beneath such plane, locking the nut to the panel 12 and holding it firmly within the aperture; surfaces 28 being in bearing contact with the vertical surfaces of the aperture 13.

FIG. 2 shows a strip 40 of locking nuts 20 joined together and FIG. 2a shows the strip as initially formed. As can be discerned, the cross-sectional configuration readily permits the main body of the strip to be formed by extrusion. A simple secondary operation is required which may be achieved by drilling the nut apertures 24 with a drill shaped to provide the bevel and the interior relief shown in FIG. 3. The extruded strip is also partially severed to define the individual nuts. Severing is limited to leave a web 42 of integral material joining the individual nuts together. Web 42 is made thin enough to provide a hinging action permitting the strip of nuts to be reeled for handling, storage, and use in application tooling and thick enough not to be broken accidentally. In an actual embodiment wherein the nuts were formed of nylon the web was on the order of 0.010 of an inch in thickness. In accordance with the inventive concept in one aspect thereof, the partially severing of the nuts in production is achieved with a minimum displacement of the material of the nuts so that each nut is within a close tolerance lengthwise identical to each other nut of a given strip of nuts. The severing is achieved in a preferred embodiment by a sharp knife blade which cuts or slices rather than by a saw, which removes material, or by other processes which remove material. The latter production technique could leave the trailing edge of the head portion of one nut and the leading edge of the head portion of an adjacent nut spaced apart so that the tear line along the web might be different for different nuts severed from the strip. By slicing the nuts lengthwise of the strip, accurate dimensional control can be achieved in that nut dimension which is relatively fixed; i.e. not made readily compressible by the leg structure.

In summary, as to the locking nut of the invention, it is of a plastic material of a form which may be readily manufactured by low cost manufacturing techniques. It is of a form which may be reeled, and which may be readily handled in stick or strip assemblies of nuts. The individual nuts are hinged together for this latter purpose through a web which may also be readily severed to facilitate field usage in production in strip form or one or two at a time if desired. The nut strip is in an extruded form with accurate placement assured by the secondary operation of severing the nuts to a proper length.

Turning now to FIGS. 4, 5 and 6, one embodiment of a hand tool shown as 50 is detailed. Tool 50 is comprised of a housing formed of elements 52 and 54, fastened together as by rivets 56. Elements 52 and 54 are preferably molded of plastic to have an exterior configuration to fit the hand, fingers and thumb of an operator; the fingers pressing the lower portion toward the palm wth the thumb on a button 64. The forward external configuration of elements 52 and 54 define stop surfaces 55 and 57 for a slidably mounted operating button 64. The front face 59 of elements 52 and 54 defines a bearing surface for pressing a nut into a working aperture. The interior of elements 52 and 54 is relieved, as shown in FIG. 6, to define a channel 58 to accommodate the main body of a strip 40 of nuts 20 with a further relief shown as 60, which accommodates the head of the nuts and keeps a strip in alignment for feeding through tool 50. As can be seen from FIGS. 4 and 5, strip 40 is fed through the rear of the handle portion of tool 50 and along the channel and out past face 59.

In use the tool is manipulated to the position shown in FIG. 5 with one extended nut 20 being deflected upwardly to bear against face 59 proximate to an aperture 13 and of panel 12. The lower edge of the nut is then worked into aperture 13 and the tool is then displaced to the position shown in FIG. 6. As can be seen from FIG. 6, the nut head 22 is pressed down flat by surface 59 so as to be at right angles to the remainder of the nuts in strip 40, deflecting web 42. At this point the tool is then twisted, as indicated by the arrows in FIG. 6, to break web 42 and free the inserted nut 20 from the strip and from the tool, leaving it in position in the panel.

The interior of the elements 52 and 54 is made to include an anti-backup pawl 62, preferably formed of a metal finger. Pawl 62 is fastened to the interior of channel 58 and includes an end bent down and shaped to engage an aperture 24 in head 22 of each nut and prevent strip 40 from backing out of the tool. Button 64 is secured by a suitable engagement within portions of elements 52 and 54 for sliding movement between the surfaces 55 and 57. Button 64 is made to include a feed pawl in the form of a metal finger 65 biased down to engage the aperture 24 of each nut. When the button 64 is manipulated to the rear against surface 55 feed bawl 65 rides over the heads 22 of the strip to snap downwardly into the aperture of a nut therebeneath. Button 64 is then pushed forwardly to abut surface 57 carrying the strip forwardly to cause one nut to be extended out of the tool in the position shown in FIG. 4 and used as previously described.

Strips 40 may be provided for a tool 50 in suitable lengths or sticks having twenty or forty or more individual nuts for a given set or series of apertures in a given installation application. It is further contemplated that strips of much larger numbers of nuts may be provided through a portable reel supply carried adjacent to or near to the tool 50.

Tool 50 thus facilitates installation of a locking nut by first positioning a given nut of a supply of nuts ahead of the tool and ready for insertion in an aperture; facilitating insertion of the nut within an aperture; and facilitating severing of the nut from a strip supply of nuts. The tool is simple, has only one moving part, and yet can greatly facilitate production or field use of fasteners, such as the locking nut shown.

With the steps for use of tool 50 in mind, it is worthwhile to also mention that the strip 40 lends itself to use by hand directly if necessary or desirable. For example, by grasping a strip of nuts in the hand, nut head against the palm, the leading nut can be bent up by the index finger with the thumb holding the adjacent nut and strip relatively fixed, the leading nut can then be partially inserted in a panel aperture with the thumb then forcing the partially inserted nut home. With the nut seated in the aperture and index finger and thumb gripping the adjacent nut, a twist of the hand will sever the inserted nut from the strip, the aperture holding the inserted nut fixed. One may, of course, readily sever one nut or two or more directly from a strip or from tool 50 for individual uses as in replacement, or in more custom use applications, or at a site on a production application relatively removed from where the bulk of fasteners are applied.

Turning now to a semiautomatic version of a hand tool, FIGS. 7–11 show a tool 70 with a strip 40 loaded therein. The view in FIG. 7 has the end portions of the handle abbreviated to get the view on the sheet of drawing. These portions may be considered to extend down for a distance sufficient to enable one to grasp a fixed handle portion 72 and tool trigger 74 in one hand. The upper portion or head of the tool includes a fixed housing 71 which opens to the left at 73 to accommodate the extension of lock nuts therefrom. The interior of the upper part of the tool defines a nut strip passageway. The strip of nuts is fed in an inverted position, as shown in FIG. 7, from the right end through an opening 75 along the passageway toward 73. Closure of 74 toward 72 operates to first feed a nut out of 73; to then cock and subsequently release a spring loaded hammer which strikes the nut extended from the tool; to tear such nut from the strip and drive it home within a panel aperture. By providing and indexing mechanism which causes a nut to extend outwardly from the tool, the initial positioning of the nut within an aperture is greatly facilitated. The hammer action is quite sufficient to fully assure the nut being driven home and seated within the aperture. The relief 30 of the nut serves to prevent plastic scraped on the legs from building up to stop the nut head from being fully seated in the panel aperture.

Turning to FIG. 8, a more detailed description of the tool 70 will now be given. The fixed handle portion 72 includes an interior relief at 77 to accommodate a triggering mechanism. The tool trigger 74 is secured to the handle for pivotal movement by a pin 76, which can be seen from the outside in FIG. 7. Closure of the trigger 74 operates to drive a roller 78 mounted on the trigger from an initial position to a final position shown by dotted lines in FIG. 8, which depicts trigger movement between these extreme positions. During this movement roller 78 is driven to bear against an arm 80 secured for pivotal movement at 82 and having a flange 86 against which roller 78 bears. Flange 86 includes a turned portion 88 through which is mounted a slide pin 90 having a headed end 92 and opposite thereto a rounded end 94. Spaced therefrom is a washer 93 fixed to the pin and loaded by a compression spring 95 to drive the pin in a generally upward direction. The upper end of arm 80 includes a pin 84 carrying a hammer cocking link 94 rounded upwardly at each end as at 96 and 98. Link 94 includes an indentation shown as 97 engaged by 94 of pin 90 to bias the link 94 upwardly and pivotally about 84. As arm 80 is driven by 78 to rotate in a clockwise sense, pin 84 is driven between the initial and final positions indicated by the dotted lines in FIG. 8 representing the positions of hammer pick up and hammer release, respectively. Hammer release is effected when the link 98 end engages a strike plate 100 disposed on the interior of the handle portion 72, which surface is at an angle to cause the link to pivot in an anti-clockwise sense dropping the end 96 downwardly and out of a recess 115 in the hammer to release the hammer.

As shown to the right in FIG. 8, a block 102 is pinned to the fixed part of the head portion by a pin 104. As shown in FIG. 7, pin 104 is headed and the wall structure of the head portion includes an aperture 105 which is shaped to accommodate 104 to set block 102 in either of two positions to adjust hammer spring pressure and the force of impact of the hammer.

As shown in FIG. 8, the left end surface of 102 includes an annular recess 106 of a configuration to receive and support a hammer spring 120. To the left of the view shown in FIG. 8 the tool includes a fixed block 108 pinned to the fixed part of the head portion by a pin 110 (see FIG. 7). From FIG. 8 the block 108 may be seen to include a bumper plate 112 position to receive a cushion 116 secured to a leading edge of hammer 114. The upper surface of 108 operates as one bearing surface for the hammer; a further bearing surface being defined by rails extending along the tool length shown by the elements numbered 113 in FIG. 11. As can be seen toward the center of FIG. 8, hammer 114 includes to the right an interior bore 118 positioned to accommodate hammer spring 120. Spring 120 is relatively heavy and operates when loaded in compression to drive the hammer 114 to the left.

Hammer 114 includes extending from its upper surface a pin 122 and spaced to the right from the free end thereof a projection defining a surface 124. The left end of the hammer defines a striking surface 126 which drives a locking nut upon release of the hammer. Resting on top of the hammer is a nut stop slide 132 having an aperture 130 extending partially along the length thereof and dimensioned to accommodate the free end of pin 122 which slides therein, responsive to hammer movement. FIGS. 9 and 10 show the pin 122 in movement within aperture 130. Toward the forward end of the slide on the upper surface thereof is a groove shown as 134 in FIGS. 8, 9 and 10, which receives a slide latch spring 136, the end of which is shown engaging 134 in FIG. 8. Spring 136 is mounted on a fixed portion 138 which extends across the tool to join the sidewalls of the fixed part of the housing, as best shown in FIG. 11. The nut stop slide has an initial position to the left of the position actually shown in FIG. 8, with the left end surface thereof blocking the passage of the leading nut 20 of the strip 40 from downward travel. As the hammer is dragged to the right by initial closure of the trigger, the free end of pin 122 engages the right end of the slot 130 to drag the slide 132 to the right into the position shown in FIG. 9, thus clearing the passageway so that the leading nut 20 of strip 40 can move down into a position for insertion within a panel aperture. The groove 134 in the slide is engaged by spring 136 to hold the slide momentarily, thus holding the leading nut back until the hammer is well clear of the nut passageway. As the hammer clears the passageway pin 122 forces slide 132 to override spring 136 and move to the right, clearing the passageway.

The tool mechanism, as shown in FIG. 8, is at a point just immediately prior to the end of slide 132 being forced to clear the passageway permitting a nut to be forced down into a position of use. At the righthand end of the tool internally of the fixed portion of the head is a feed-slide slot 140, shown in FIG. 11, accommodating a feed slide 142, shown in FIG. 8. Feed slide 142 carries thereon a pin 144 (FIG. 8) having a tension spring 146 hooked thereover, the opposite end of the spring being hooked to a fixed pin 148 toward the lefthand end of the tool. The upper portion of the tool head includes (to the right in FIG. 8) a web 150 which defines with a cap portion 152 the entry opening 73 for strip 40. FIG. 11 shows the configuration of 152 to include an interior channel 154 and a pair of slots 156 of a cross-sectional configuration to house the nuts 20, positioning the strip 40 and permitting its movement along the tool.

As shown in FIG. 8, the front end of the tool includes an interior surface 158 positioned to guide the strip downwardly. Beneath the surface 158 are further surfaces cut into the sidewalls of the head, shown as 160 and 162, which operate to engage the head of each nut and guide the nut and thus the strip downwardly toward the impact site. To the right, as shown in FIG. 8, mounted on web 150 is a fixed pawl in the form of a spring 164 biased upwardly to engage aperture 24 of each nut of the strip and prevent rightward displacement of the strip as mounted within the interior channel 154. A feed pawl 166 is secured to feed slide 142 to similarly engage aperture 24 of each nut and thus of the strip. When nut stop slide 132 does clear the leading nut, spring 146 pulls the feed slide 142 to the left indexing the strip to the left, the pin 144 also moving to the left to the position shown by the dotted line in FIG. 8. The strip will stop as the leading nut bottoms on the surface shown as 168 to the left end of the tool, as shown in FIG. 8. As the hammer is carried to the right to the point of release indicated by the dotted line shown in FIG. 8, it will engage the lower end of pin 144 to carry it to the right and thus carry the feed slide to the right, pawl 166 riding over into an adjacent nut aperture to latch therein and hold spring 146 in tension. During this operation holding pawl 164 prevents the strip from rightward displacement.

As can be seen in FIGS. 9 and 10, the front end of the tool includes fixed wall portions 170 which define at 172 a guide for the hammer forward portion. On the front face of 170 are surfaces 174 which engage a panel having an aperture into which a nut is to be driven. As can be seen in FIGS. 7, 9 and 10, the portions 170 include slots in each side shown as 176, each having a pin 178 extending in a vertical sense therethrough, mounting a jaw shown as 180. Each of the jaws includes a spring 184 mounted as by a screw 182 with each spring end shown as 186 bearing against the outer sidewall of the tool head to bias the jaw inwardly into the position shown in FIG. 9, pivoting about pin 178. The interior forward portion of each jaw includes a slot shown as 188, which is dimensioned to receive the head of a nut 20 and guide such nut downward into the impact position. FIG. 9 shows by dotted line a nut in position with the nut head fitted within slots 188 of the jaws. Each jaw includes a further surface shown as 190 which is beveled and positioned to be engaged by the leading edge of the hammer, as at 126, as shown in FIG. 9, as the hammer moves forwardly to drive the jaws outwardly pivoting on pins 178 and permit the hammer to engage the nut which is then in impact position. FIG. 10 depicts the hammer in this position, driving a nut 20 within the aperture of a panel. Following impact and insertion of a nut, hammer 114 is withdrawn by again closing the trigger 74. As the hammer is withdrawn to the position shown in FIG. 9, jaws 180 will again close in the position shown in guide and position the next nut.

As previously mentioned with respect to the simple version of the hand tool, it is contemplated that reels of nuts may be supplied for use with a tool 70, the reel either being separately carried or mounted on the hand tool in a suitable fashion.

Having now disclosed my concept for fastening elements together in terms intended to enable a preferred practice thereof, in its various modes, claims are appended which are believed to define what is inventive.

What is claimed is:

1. In a method of installing fasteners and the like within the apertures of a panel, wherein said apertures are noncircular in cross-section, the steps comprising providing a series of plastic fastener elements each having a cross-section different from that of said apertures and each joined by a web of plastic material to define a fastener strip, said web being sufficiently thin for the strip to bend for handling and tearing of said web to separate one fastener element from the strip, positioning a leading fastener element as joined to the strip with at least a portion of said element extended within the aperture of a mounting panel, and then severing said leading fastener element from said strip while positioned within said aperture, the said step of severing comprising twisting the strip and thereby tearing said web from one end to the other, the associated aperture holding the fastener element against movement.

2. As an article of manufacture, a strip of identical fasteners of plastic material each comprising means including an extending leg portion for insertion within the aperture of a mounting element and a head portion forming means to limit fastener insertion in the said aperture, a thin web of material adjoining the head portions of adjacent fasteners, said web being sufficiently thin to permit one fastener to be separated from an adjacent fastener by being torn by hand and being positioned at a point on said fastener to permit one fastener of said strip to be positioned with the leg portion thereof free of the adjacent fastener of said strip to facilitate insertion while said one fastener is still attached to said strip, each of said fasteners further comprising an interior relief located between said leg portion and said head portion to accommodate plastic material scraped off said leg portion during its insertion into said aperture.

3. As an article of manufacture, a fastener element having a lower leg portion arranged for insertion into an aperture of a mounting panel, said aperture having a noncircular cross-section, said leg portion having a predetermined length and a predetermined width, the leg portion including spaced apart wall portions defining a deformable structure in the sense of said predetermined width and a solid structure in the sense of said predetermined length, the said fastener element consisting of a thermoplastic material and having an extruded profile which defines said predetermined width, with the said predetermined length of said leg portion defined by cut surfaces thereby minimizing the effect of extrusion tolerances upon the function of said fastener element.

4. For use in an assembly process to secure a component to a plate or panel having mounting apertures therein, an integral strip of plastic fasteners, each fastener comprising a shank portion, a flange portion, and a component engaging portion, all of said portions including a bi-directional exterior which presents two distinct profiles, one of which is an extruded profile which is in common to all of said portions with the shank portion projecting along an insertion axis at 90° and centrally from said flange portion, the other profile comprising cut surfaces disposed in planes which are perpendicular to the extrusion axis, and a thin web of plastic fastener material forming joining sections to join together adjacent fasteners at their flange portions, the said joining sections each having an area and strength to sustain the integrity of the strip while the leading fastener is bent approximately 90° to said extrusion axis during installation of the shank portion thereof in an aperture in said plate or panel, said joining sections being severable to separate the leading fastener from the strip by a shearing action produced by supporting the remainder of the strip without significant distortion while driving the leading fastener into an installed position in said aperture.

5. For use in an assembly process to secure a component to a plate or panel having mounting apertures therein, an integral strip of plastic fasteners, each fastener comprising a main body, a shank portion depending from said body, a flange portion projecting laterally from said body, and a component engaging portion supported by said body, all of said portions being defined by a bidirectional exterior which presents two distinct profiles one of which is an extruded profile which is in common to all of said portions with the shank portion projecting along an insertion axis at 90° to the extrusion axis, the other profile comprising cut or sheared surfaces located in planes which are perpendicular to said extrusion axis, and a thin web of plastic fastener material forming joining sections to join together adjacent fasteners via their flange portions, the said joining sections each having an area and strength to sustain the integrity of the strip while the leading fastener is bent acutely away from said extrusion axis to afford engagement thereof by a driving implement during installation of the shank portion thereof in one of said mounting apertures, said joining section being rent upon driving the leading fastener from the strip into an installed position within said mounting aperture by a shearing action with the remainder of the strip providing one element of the shear.

References Cited
UNITED STATES PATENTS

| | | | |
|---|---|---|---|
| 2,693,875 | 11/1954 | Chaffee | 24—30.5 X |
| 3,083,429 | 4/1963 | Barlow et al. | 24—208 |
| 3,130,464 | 4/1964 | Barlow | 24—216 X |

FOREIGN PATENTS

| | | | |
|---|---|---|---|
| 985,896 | 3/1951 | France | 24—208 |

J. KARL BELL, Primary Examiner